United States Patent
Andonian et al.

(10) Patent No.: US 10,524,419 B1
(45) Date of Patent: Jan. 7, 2020

(54) MOWER DECK STABILIZER

(71) Applicant: Accelerator Industries, Inc., Kent, WA (US)

(72) Inventors: Peter G. Andonian, Mercer Island, WA (US); David J. Hackett, Kent, WA (US)

(73) Assignee: Accelerator Industries, Inc., Kent, WA (US)

( * ) Notice: Subject to any disclaimer, the term of this patent is extended or adjusted under 35 U.S.C. 154(b) by 296 days.

(21) Appl. No.: 15/605,715

(22) Filed: May 25, 2017

(51) Int. Cl.
*A01D 34/82* (2006.01)
*A01D 34/74* (2006.01)
*A01D 34/64* (2006.01)
*A01D 34/71* (2006.01)
*A01D 101/00* (2006.01)

(52) U.S. Cl.
CPC ............. *A01D 34/82* (2013.01); *A01D 34/71* (2013.01); *A01D 34/64* (2013.01); *A01D 34/74* (2013.01); *A01D 2101/00* (2013.01)

(58) Field of Classification Search
CPC ........ A01D 34/82; A01D 34/71; A01D 34/74; A01D 34/64; A01D 34/81; A01D 2101/00
See application file for complete search history.

(56) References Cited

U.S. PATENT DOCUMENTS

| | | | | |
|---|---|---|---|---|
| 3,292,351 A | * | 12/1966 | Larson | A01D 34/74 56/17.2 |
| 3,512,344 A | * | 5/1970 | Kortum | A01D 34/64 56/17.1 |
| 4,120,136 A | * | 10/1978 | Rose | A01B 59/044 56/15.8 |
| 4,450,673 A | * | 5/1984 | Hutchison | A01D 34/005 56/13.4 |
| 4,577,455 A | * | 3/1986 | Amano | A01D 34/64 56/17.1 |
| 4,760,686 A | * | 8/1988 | Samejima | A01D 34/74 56/15.8 |
| 5,241,810 A | * | 9/1993 | Reichen | A01D 34/54 56/17.1 |
| 5,355,665 A | * | 10/1994 | Peter | A01D 34/64 56/15.8 |
| 5,381,648 A | * | 1/1995 | Seegert | A01D 34/64 56/15.9 |
| 5,526,633 A | * | 6/1996 | Strong | A01D 34/74 280/43.13 |
| 7,003,937 B1 | * | 2/2006 | Tarver | A01D 34/74 56/17.1 |
| 7,318,311 B2 | * | 1/2008 | Wright | A01D 34/74 56/17.1 |
| 7,448,195 B2 | * | 11/2008 | Kohler | A01D 34/71 56/320.2 |
| 7,712,294 B2 | * | 5/2010 | Wright | A01D 34/74 56/16.3 |

(Continued)

FOREIGN PATENT DOCUMENTS

WO  WO-2018235052 A1 * 12/2018 ............. A01D 34/74

*Primary Examiner* — Robert E Pezzuto
*Assistant Examiner* — Joan D Misa
(74) *Attorney, Agent, or Firm* — Duncan Galloway Egan Greenwald PLLC; Theresa Camoriano; Guillermo Camoriano (57) ABSTRACT

A mower deck stabilizer releasably and adjustably engages the mower deck to the mower frame to provide a counter-balancing force to the cantilevered load of a side-mounted catcher.

3 Claims, 6 Drawing Sheets

(56) References Cited

U.S. PATENT DOCUMENTS

| | | | |
|---|---|---|---|
| 7,716,906 B2 * | 5/2010 | Swart ..................... | A01D 34/74 |
| | | | 56/14.9 |
| 8,166,737 B2 * | 5/2012 | Ninomiya .............. | A01D 34/74 |
| | | | 56/17.2 |
| 9,642,304 B1 * | 5/2017 | Smith ..................... | A01D 34/74 |
| 2007/0062170 A1 * | 3/2007 | Finkner .................. | A01D 34/74 |
| | | | 56/14.9 |

* cited by examiner

MOWER DECK STABILIZER

BACKGROUND

The present invention relates to lawnmowers. More particularly, it relates to a mower deck stabilizer which can be releasably and adjustably engaged or disengaged.

Mower decks typically are height adjustable such that the user may choose how short or how tall to cut the grass. Even at a particular height setting, the mower deck is typically allowed a certain amount of vertical movement to accommodate bumps over uneven terrain.

It is common to attach a grass/leaf catcher to the mower deck in order to collect the grass clippings/leaves. It is advantageous to have large capacity catchers so as to minimize the frequency with which the catcher must be emptied.

Unfortunately, a good, commercial grade catcher is relatively heavy even when empty; and the weight situation is only exacerbated as the catcher fills with clippings. A cantilever-mount catcher, mounted off to one side of the mower deck, applies a non-balanced load on the deck, which may result in a tilted deck and thus an uneven mowing of the lawn.

SUMMARY

The present invention provides a mower deck stabilizing mechanism which allows for easy height adjustment of the mower deck relative to the frame of the mower, and which also allows for some vertical movement to accommodate bumps over uneven terrain, while keeping the mower deck level, so as to ensure an evenly mowed lawn, even when a heavy grass catcher is mounted on the mower deck. An embodiment of the present invention provides a mower deck stabilizing mechanism which releasably and adjustably engages the mower deck to the mower frame to provide a counterbalancing force which counterbalances the cantilevered load of a side-mounted catcher.

DESCRIPTION

Figure 1:
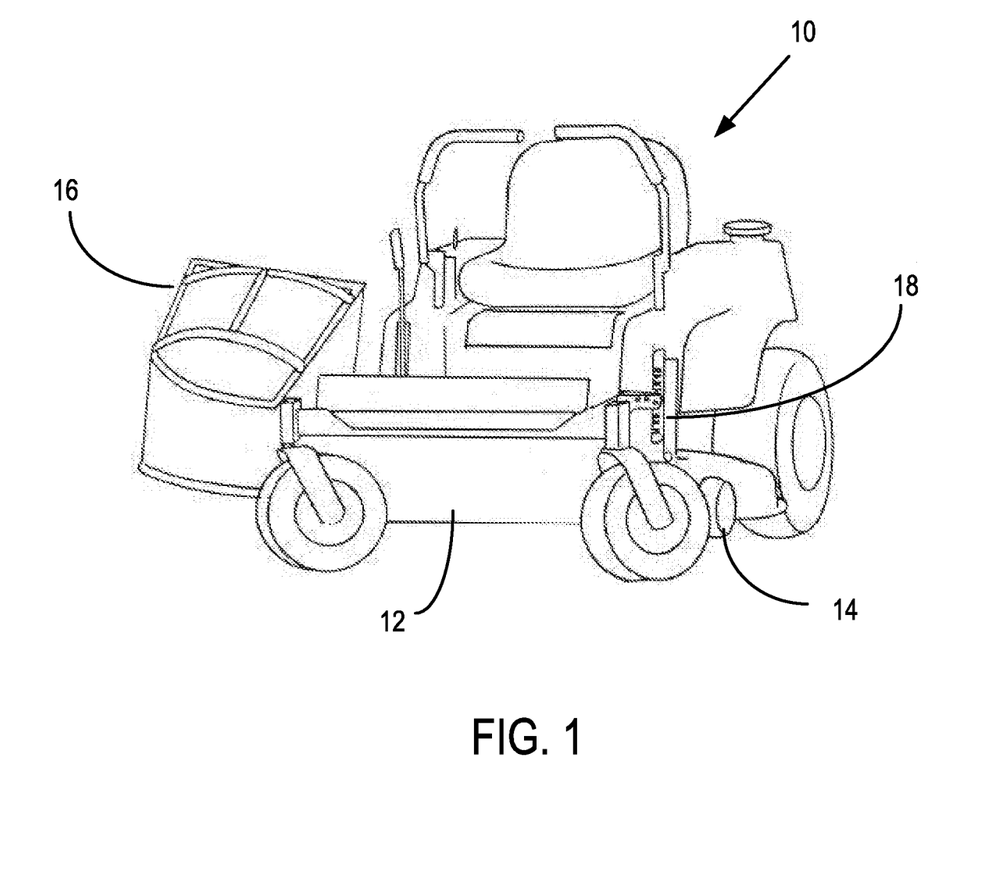
FIG. 1 is a perspective view of a lawn mower with a mower deck and a mower deck stabilizer in accordance with one embodiment of the present invention.

FIGS. 1-9 show several embodiments of a mower deck stabilizer. Referring to FIG. 1, the riding lawnmower 10 includes a height adjustable mower deck 12 supported on the lawnmower frame. The mower deck 12 may be set by the user at any one of several pre-determined height levels relative to the mower frame so as to adjust the height of the cut of the lawn being mowed. The mower deck includes elevated, non-powered wheels 14, supported on the mower deck 12, the purpose of which is to momentarily raise the mower deck 12 in the event of a bump or raised spot in the lawn, to prevent "scalping" of the lawn by the cutting blades. The wheels 14 typically raise the mower deck 12 just a small distance, a couple of inches maximum, when they encounter a raised spot in the lawn. This is just enough to prevent scalping of the lawn, and the wheels 14 raise the deck 12 only momentarily, just long enough for the mower deck 12 to get past the raised spot in the lawn.

The lawnmower 10 includes a side-mounted clippings/leaf catcher 16, which is supported by, and cantilevered off of, one side of the mower deck 12. The weight of the catcher 16 (and of the clippings caught by the catcher) imposes a force which tends to tilt the mower deck 12, which may result in an uneven mowing of the lawn. A mower deck stabilizer 18, as described in more detail below, is located on the opposite side of the mower deck 12 and provides a counter-balancing force on the mower deck 12, which keeps the deck 12 horizontal in order to ensure an evenly mowed lawn.

Figure 2:
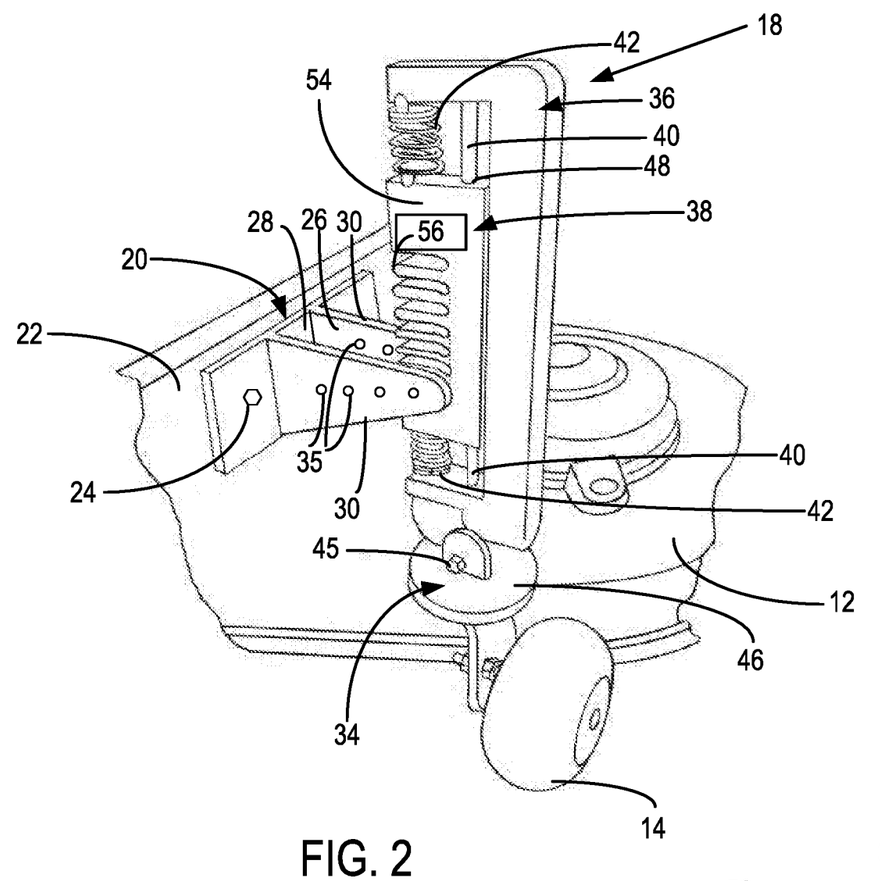
FIG. 2 is a broken-away, perspective view of the mower deck stabilizer of FIG. 1.

Referring now to FIG. 2, the mower deck stabilizer 18 includes a frame bracket 20 mounted on the mower frame 22, a deck bracket 34, mounted on the mower deck 12, and a stabilizer bar 36, pivotably mounted on the deck bracket 34. A follower 38 is mounted on the stabilizer bar 36 for movement along a linear track 40. Shock absorbers 42 are mounted between the stabilizer bar 36 and the follower 38.

Figure 7:
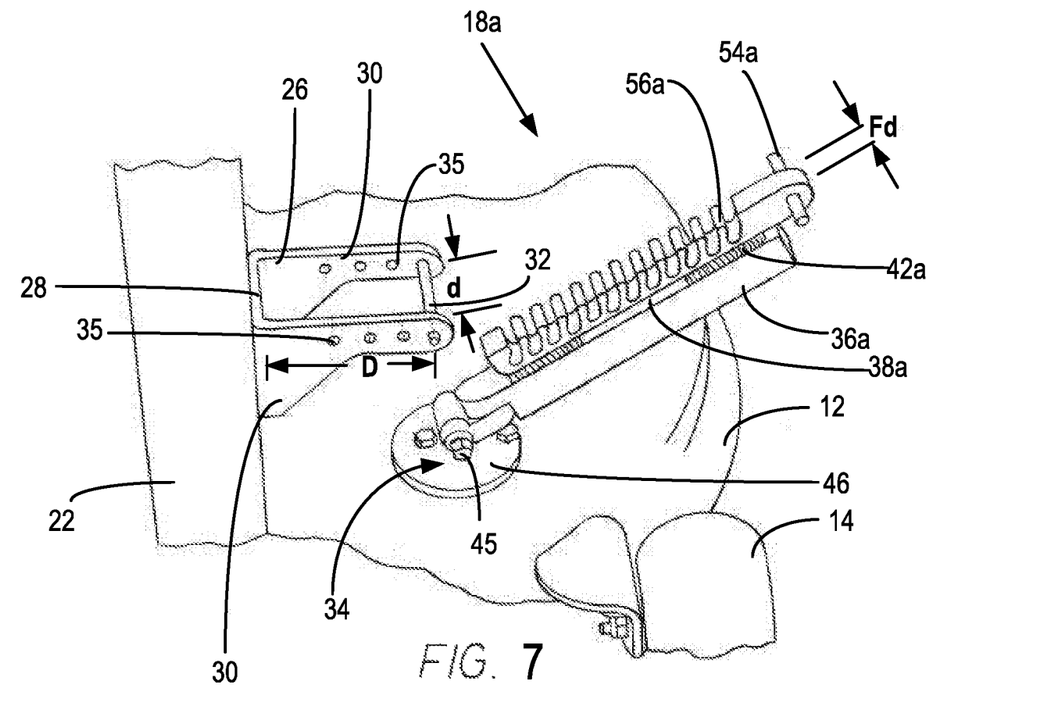
FIG. 7 is a broken-away perspective view of the mower deck stabilizer of FIG. 4 but with the stabilizer arm disengaged from the frame of the lawn mower.

The frame bracket 20 is secured to the mower's frame 22 by any suitable means, such as by bolts 24 (See also FIG. 4) or by welding, for instance. The frame bracket 20 defines a U-shaped member 26 with a base portion 28 and two spaced-apart lateral arms 30. As shown in FIG. 7, the spaced apart arms 30 define a first distance "d" between the arms 30. A spanning member 32 extends between, and is secured to, the spaced-apart, lateral arms 30 and defines a second distance "D" between the spanning member 32 and the base portion 28. Note that the arms 30 define a plurality of pairs of aligned openings 35. The spanning member 32 may be installed in any pair of aligned openings 35 in the corresponding arms 30 to adjust the distance D, as described in more detail below.

The deck bracket 34 includes a deck bracket base portion 46, which is secured (as by bolting or welding, for instance) to the mower deck 12 in a position which permits the follower 38 to engage the spanning member 32 on the frame bracket 20 when the stabilizer bar 36 is rotated to the vertical position, as described later.

Figure 4:
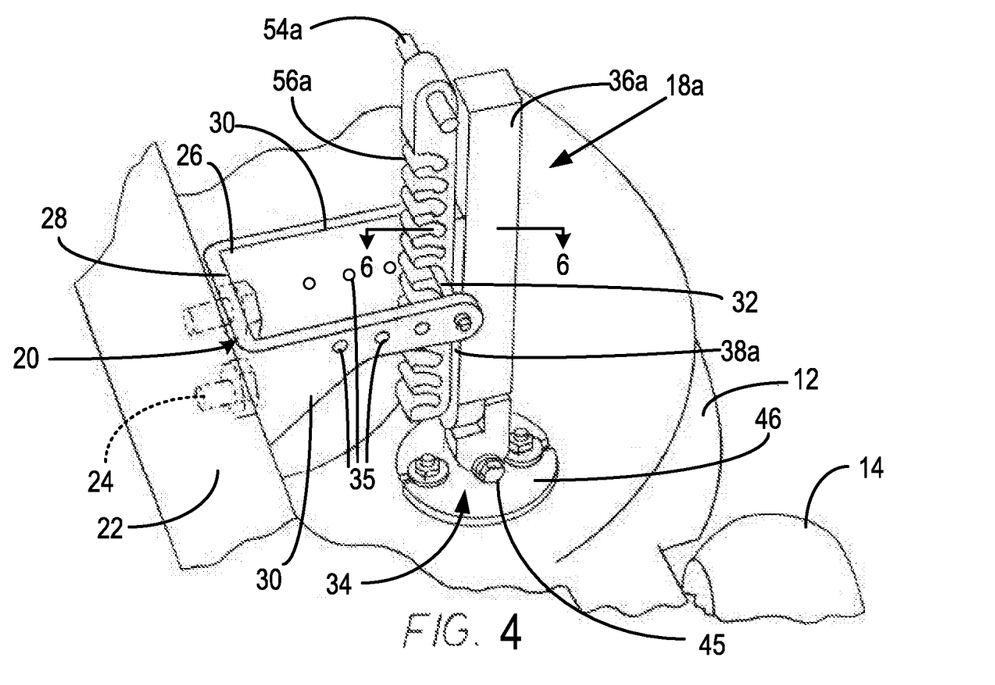
FIG. 4 is a broken-away, perspective view, similar to FIG. 2, of a second embodiment of a mower deck stabilizer.
Figure 5:
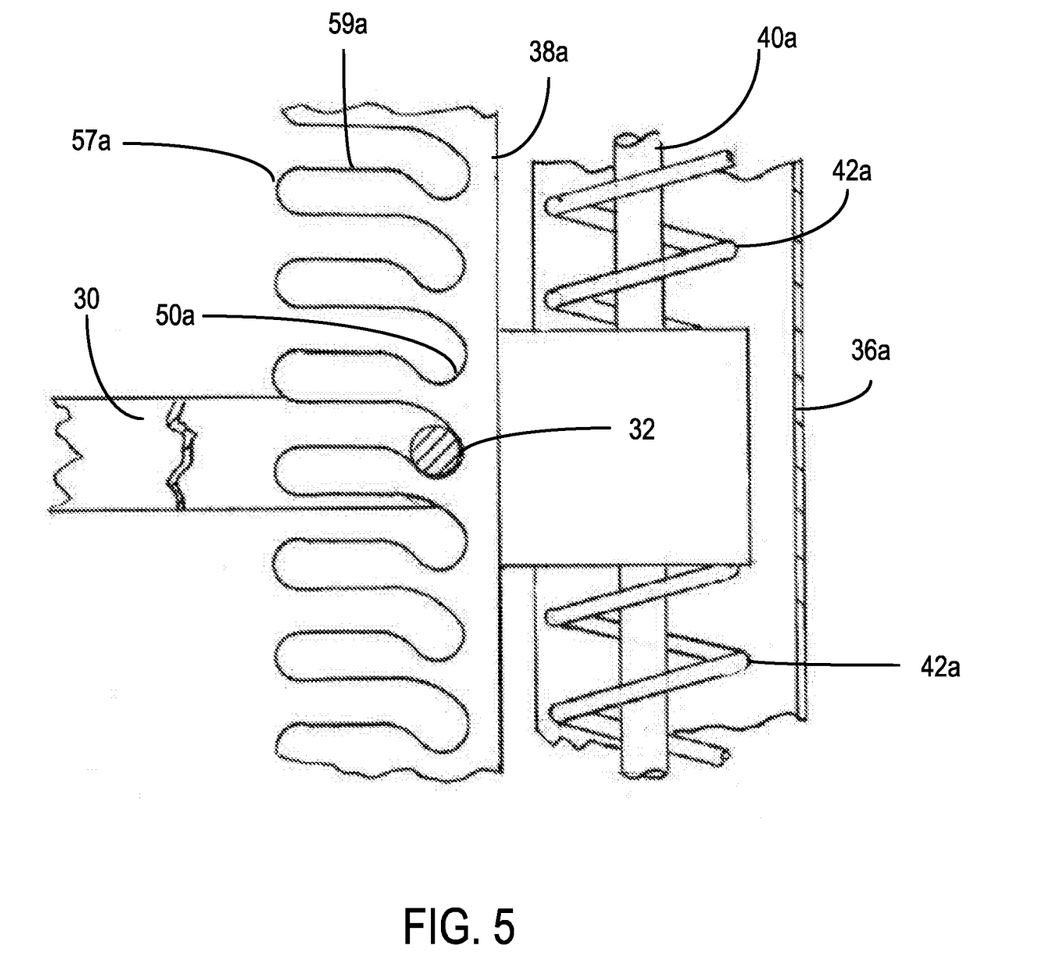
FIG. 5 is a broken-away, side sectional view of the embodiment of FIG. 4.

As shown in FIGS. 2 and 4, the stabilizer bar 36 is pivotably mounted to the mower deck 12 via a pivot pin 45, which extends through the deck bracket 34 and through the stabilizer bar 36. The stabilizer bar 36 may be pivoted relative to the deck bracket 34 about the pivot pin 45. This allows the stabilizer bar 36 to be pivoted away from the frame bracket 20 and to lie flat on the mower deck 12 when not in use.

Figure 3:
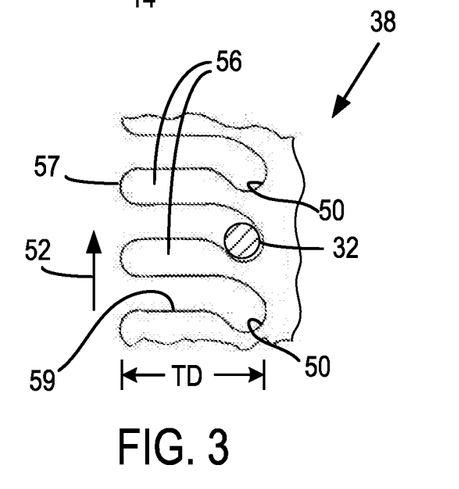
FIG. 3 is a broken-away, side view of three of the recesses in the follower of the mower deck stabilizer of FIG. 2, with the spanning member engaging one of the recesses, shown in section.

Referring to FIGS. 2 and 3, the follower 38 defines a plurality of vertically-spaced-apart tongues 56. Each of the tongues 56 has a width less than the distance d, so the tongue 56 can fit between the arms 30. Each of the tongues 56 also has an outer free end 57 and a top surface 59 defining a recess 50 spaced inwardly from the outer free end 57. The distance from the outer free end 57 to the recess 50 is less than the distance D, so the tongue 56 can be received between the arms 30 and can receive the spanning member 32 in the recess 50.

The follower 38 also defines an elongated, vertical opening 48, which receives an elongated vertical member 40 with a sliding fit. The vertical member 40 is fixed to the stabilizer bar 36. The opening 48 and vertical member 40 are sized and located so that the vertical member 40 serves as a linear track 40, which mounts the follower 38 to the stabilizer bar 36 and restricts the motion of the follower 38 relative to the stabilizer bar 36 to linear motion in the elongated direction of the stabilizer bar 36. Upper and lower coiled springs 42, mounted between the stabilizer bar 36 and the follower 38, limit the linear motion between the follower 38 and the stabilizer bar 36 and absorb shocks in the linear direction. Of course, other known types of shock absorbers, such as bellows, sets of repelling magnets, etc., could be used instead of the springs 42. Also, it is not necessary to have both upper and lower shock absorbers. A single shock absorber may perform the desired function.

Referring briefly to FIGS. 2 and 3, the tongues 56 (and the spaces between the tongues 56) extend substantially in the horizontal direction when the stabilizer bar 36/follower 38 assembly is in the upright, vertical direction. The recesses 50 at the innermost end of the tongues 56 slope downwardly to "lock" onto the spanning member 32.

Referring to FIG. 1, the weight of the catcher 16 pushes down on the left side of the mower deck 12, which tends to push up on the opposite side (the right side) of the mower deck 12. The mower deck stabilizer 18 is located on that opposite side to counteract that upward force. The upward force on the mower deck 12 is transmitted through the stabilizer arm 36 and through the follower 38, as indicated by the arrow 52 in FIG. 3. This upward force causes the follower to push upwardly on the spanning member 32, retaining the spanning member 32 in the recess 50.

To install the mower deck stabilizer 18 to the lawnmower 10, the frame bracket 20 is mounted to the mower frame 22, and the deck bracket 34 is mounted to the mower deck 12.

With the catcher 16 mounted on the mower deck 12, the operator pushes down on the side of the mower deck 12 opposite the side where the catcher 16 is mounted and pivots the stabilizer bar 36 toward the frame bracket 20 until the spanning member 32 enters along the top surface of one of the tongues 56 and is received into one of the recesses 50, as shown in FIG. 3.

Once the spanning member 32 is completely inside the recess 50, the operator stops pushing down on the mower deck 12. The mower deck 12 will spring upwardly just slightly due to the counterbalancing weight of the catcher 16, "locking" the spanning member 32 in the recess 50.

FIGS. 4-7 show a second embodiment of a mower deck stabilizer 18a, which is very similar to the mower deck stabilizer 18, except, in this embodiment, the linear track 40a and the shock absorbers 42a are enclosed inside the hollow body of the stabilizer bar 36a. In this embodiment, the springs 42a and the linear track 40a are coaxial with each other.

Figure 6:
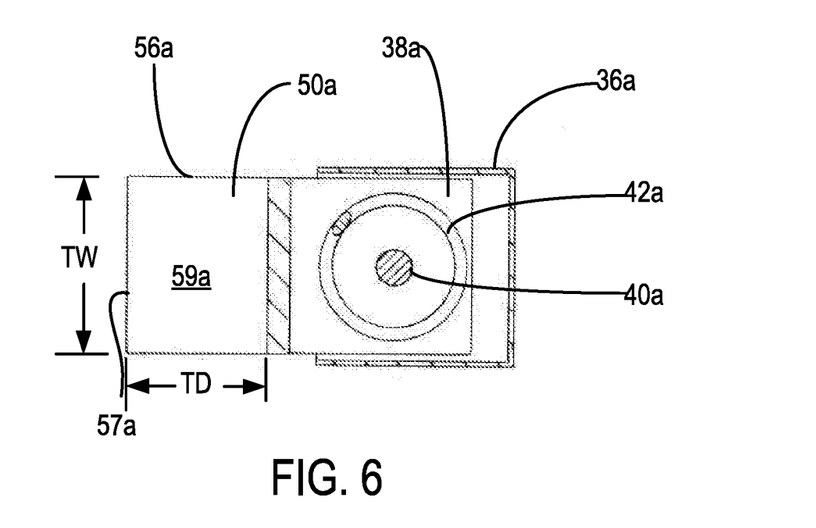
FIG. 6 is a section view along line 6-6 of FIG. 4.

FIG. 6 shows the top surface 59a of one of the tongues 56a. The tongue width TW is less than the distance d between the arms 30, so the tongue 56a can fit between the arms 30. The tongue depth TD is less than the depth D from the spanning member 32 to the base portion 28, so the tongue 56a can receive the spanning member 32 in the recess 50a in the top surface 59a. There are handles 54a at the top of the follower 38a, which are used by the operator to rotate the stabilizer bar/follower 36a/38a to the vertical position and to push down on the follower 38a to help receive the spanning member 32 along the top surface 59a of one of the tongues 56a.

The installation and operation of the mower deck stabilizer 18a is otherwise substantially identical to that of the mower deck stabilizer 18.

Figure 8:
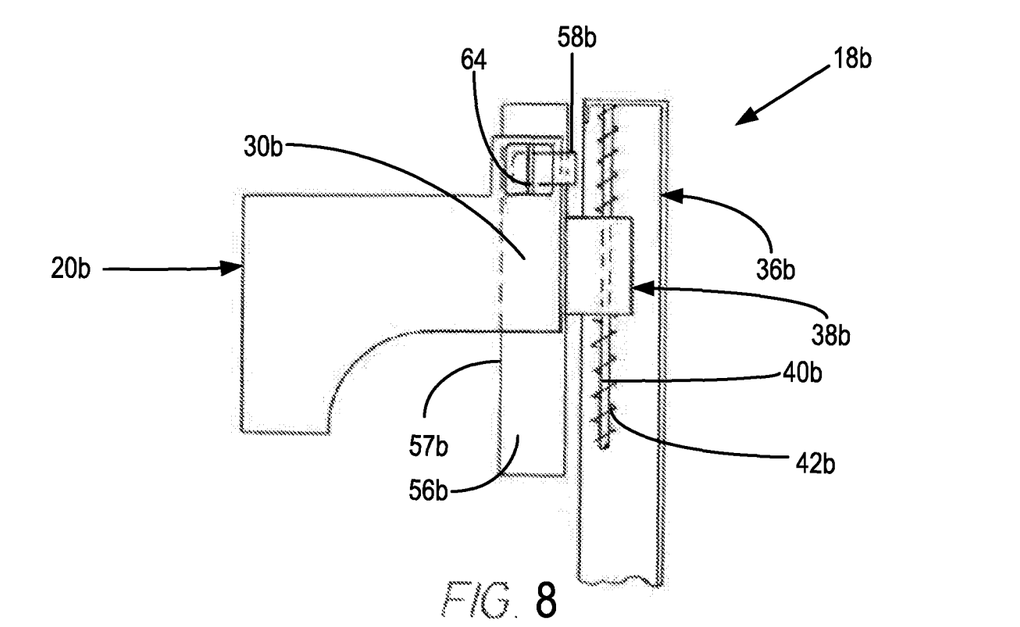
FIG. 8 is a broken-away, side view of yet another embodiment of a mower deck stabilizer.
Figure 9:
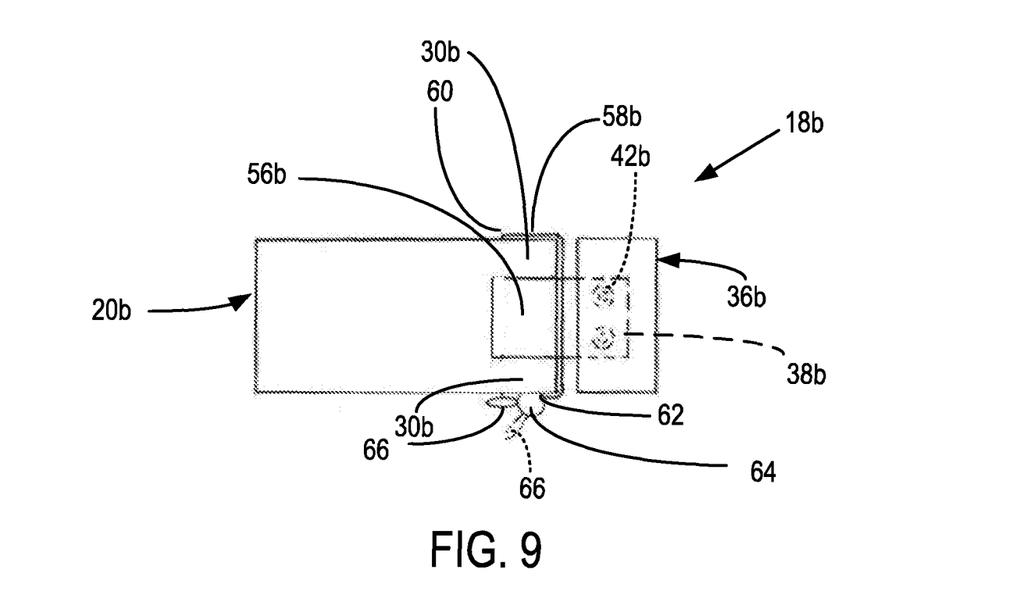
FIG. 9 is a plan view of the mower deck stabilizer of FIG. 8.

FIGS. 8 and 9 show a third embodiment of a mower deck stabilizer 18b. This embodiment is similar, in that it has a stabilizer bar 36b pivotably mounted on the mower deck 12 and a follower 38b, which mates with arms 30b on a bracket 20b that is mounted on the mower frame 22. In this third embodiment 18b, the follower 38b includes only a single, elongated tongue 56b, which has no recesses in its top surface. Instead, the tongue 56b is just a solid, rectangular bar sized to slide in between the two arms 30b of the U-shaped frame bracket 20b. The tongue 56b has a substantial portion of its rear surface free, so it can receive a strap, as described below.

In this embodiment, the rigid spanning member of the previous embodiments is replaced by a flexible spanning member in the form of a strap 58b (such as a rubber strap or a leather strap) with one of the strap ends 60 secured to one of the arms 30b and the other strap end 62 secured to an eccentric latch mechanism 64 on the other arm 30b. The eccentric latch mechanism 64 is used to tighten the strap 58b around the rear surface of the tongue 56b to fix the tongue 56b relative to the frame bracket 20b.

The latch mechanism 64 has a handle 66 which, when placed in one position tightens the strap 58b, pulling the tongue 56b forward and pressing the free front surface 57b of the tongue 56b against the frame bracket 20b with enough force to prevent relative motion between the follower 38b and the frame bracket 20b. When the handle 66 is moved to a second position (shown in phantom in FIG. 8), the strap 58b is loosened, allowing the tongue 56b to slide up or down, as needed relative to the frame bracket 20b.

The installation and operation of this mower deck stabilizer 18b is very similar to that of the previously discussed embodiments 18, 18a. The only difference is that, instead of having a rigid spanning member 32 of the frame bracket 20 engage the top surface of one of the tongues 56 on the follower 38 to releasably secure the follower 38 of the stabilizer bar 36 to the mower frame 22, the flexible spanning member 58b wraps around and tensions against the tongue 56b of the follower 38b via a tensioning mechanism, which in this instance is the latch mechanism 64.

While the embodiments described above show simple means for releasably securing a follower member mounted on the mower deck to a bracket mounted on the frame, various other known mounting and securing mechanisms could be used to achieve the same function. It will be obvious to those skilled in the art that modifications may be made to the embodiments described above without departing from the scope of the present invention as claimed.

What is claimed is:

1. A mower deck stabilizer, comprising:
a first bracket, comprising a U-shaped member, including a first base portion, adapted to be secured to a mower frame; two spaced-apart, lateral arms extending from said first base portion and defining a first distance between said two spaced-apart, lateral arms; and a spanning member extending between and secured to said spaced-apart, lateral arms and defining a second distance between said spanning member and said first base portion;

a second bracket, comprising a second base portion, adapted to be secured to a mower deck; and a stabilizer arm pivotably mounted to said second base portion; a follower mounted for linear motion relative to said stabilizer arm along a track defining a linear direction, said follower including a first tongue having a width less than said first distance; said first tongue having a first outer free end and a first top surface defining a first recess spaced inwardly from said first outer free end and defining a depth from said first outer free end to said first recess that is less than said second distance, thereby permitting said first tongue to be received between said spaced-apart, lateral arms and to receive said spanning member in said first recess when said stabilizer arm is pivoted toward said first bracket, and further comprising at least a first shock absorber mounted between said first tongue and said stabilizer arm for limiting said linear motion between said first tongue and said stabilizer arm and for absorbing shocks in said linear direction.

2. A mower deck stabilizer as recited in claim 1, and further comprising a second tongue fixed relative to said first tongue and spaced above said first tongue in said linear direction, said second tongue having a second outer free end and a second top surface defining a second recess spaced inwardly from said second outer free end and defining a depth from said second outer free end to said second recess that is less than said second distance, thereby permitting said second tongue to be received between said spaced-apart, lateral arms and to receive said spanning member in said second recess when said stabilizer arm is pivoted toward said first bracket.

3. A mower deck stabilizer as recited in claim 1, and further comprising a mower, including a mower frame and a mower deck supported on said mower frame, wherein said first base portion is secured to said mower frame, and said second base portion is secured to said mower deck.

\* \* \* \* \*